(12) United States Patent
Bates et al.

(10) Patent No.: US 7,669,112 B2
(45) Date of Patent: Feb. 23, 2010

(54) AUTOMATED SPELL ANALYSIS

(75) Inventors: Cary Lee Bates, Rochester, MN (US);
Brian John Cragun, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/828,890

(22) Filed: Jul. 26, 2007

(65) Prior Publication Data

US 2007/0271089 A1    Nov. 22, 2007

Related U.S. Application Data

(63) Continuation of application No. 11/359,686, filed on Feb. 22, 2006, now Pat. No. 7,565,606, and a continuation of application No. 09/751,574, filed on Dec. 29, 2000, now Pat. No. 7,254,773.

(51) Int. Cl.
*G06F 17/00* (2006.01)

(52) U.S. Cl. ..................................... 715/200

(58) Field of Classification Search ................ 715/200, 715/255; 707/6
See application file for complete search history.

(56) References Cited

U.S. PATENT DOCUMENTS

| | | |
|---|---|---|
| 5,287,278 A | 2/1994 | Rau |
| 5,799,276 A | 8/1998 | Komissarchik et al. |
| 5,819,265 A | 10/1998 | Ravin et al. |
| 5,832,480 A | 11/1998 | Byrd, Jr. et al. |
| 5,873,107 A | 2/1999 | Borovoy et al. |
| 5,956,739 A | 9/1999 | Golding et al. |
| 5,970,492 A | 10/1999 | Nielsen |
| 6,012,075 A | 1/2000 | Fein et al. |
| 6,026,388 A | 2/2000 | Liddy et al. |
| 6,044,387 A | 3/2000 | Angiulo et al. |
| 6,047,300 A | 4/2000 | Walfish et al. |
| 6,085,206 A | 7/2000 | Domini et al. |
| 6,101,492 A | 8/2000 | Jacquemin et al. |
| 6,131,102 A | 10/2000 | Potter |
| 6,175,834 B1 | 1/2001 | Cai et al. |
| 6,189,002 B1 * | 2/2001 | Roitblat ......................... 707/1 |
| 6,192,165 B1 | 2/2001 | Irons |
| 6,205,261 B1 | 3/2001 | Goldberg |
| 6,226,654 B1 | 5/2001 | Van Hoff |
| 6,236,987 B1 | 5/2001 | Horowitz et al. |

(Continued)

OTHER PUBLICATIONS

Aronson, Effective Mapping of Biomedical Text to the UMLS Metathesaurus: The MetaMap Program, Google 2001, pp. 17-21.*

(Continued)

*Primary Examiner*—Cong-Lac Huynh
(74) *Attorney, Agent, or Firm*—Wood, Herron & Evans, LLP

(57) ABSTRACT

An apparatus, program product and method utilize automated analysis techniques to assist in the determination of acceptable usages of linguistic terms (e.g., words, phrases, acronyms, etc.). In particular, an acceptable usage of a linguistic term in a document on the Internet may be determined by detecting a spell definition tag in the document. In response to detecting the spell definition tag, automatically adding the acceptable variant of the linguistic term to an electronic dictionary.

26 Claims, 5 Drawing Sheets

U.S. PATENT DOCUMENTS

| | | | |
|---|---|---|---|
| 6,275,789 B1 | 8/2001 | Moser et al. | |
| 6,385,629 B1 | 5/2002 | Sundaresan et al. | |
| 6,397,213 B1 | 5/2002 | Cullen et al. | |
| 6,401,060 B1 | 6/2002 | Critchlow et al. | |
| 6,453,312 B1 | 9/2002 | Goiffon et al. | |
| 6,473,730 B1 | 10/2002 | McKeown et al. | |
| 6,480,835 B1 | 11/2002 | Light | |
| 6,480,838 B1* | 11/2002 | Peterman | 707/3 |
| 6,493,000 B1 | 12/2002 | Wynn et al. | |
| 6,519,586 B2 | 2/2003 | Anick et al. | |
| 6,549,897 B1 | 4/2003 | Katariya et al. | |
| 6,578,032 B1 | 6/2003 | Chanrasekar et al. | |
| 6,616,704 B1 | 9/2003 | Birman et al. | |
| 6,636,849 B1 | 10/2003 | Tang et al. | |
| 6,675,169 B1 | 1/2004 | Bennett et al. | |
| 6,678,694 B1 | 1/2004 | Zimmermann et al. | |
| 6,694,484 B1 | 2/2004 | Mueller | |
| 6,708,311 B1 | 3/2004 | Berstis | |
| 6,718,363 B1 | 4/2004 | Ponte | |
| 6,738,964 B1 | 5/2004 | Zink et al. | |
| 6,782,510 B1 | 8/2004 | Gross et al. | |
| 6,785,869 B1 | 8/2004 | Berstis | |
| 6,845,354 B1 | 1/2005 | Kuo et al. | |
| 6,918,086 B2 | 7/2005 | Rogson | |
| 6,941,293 B1* | 9/2005 | Dean et al. | 707/3 |
| 7,032,174 B2 | 4/2006 | Montero et al. | |
| 7,162,465 B2* | 1/2007 | Jenssen et al. | 707/1 |
| 7,246,041 B2 | 7/2007 | Fukuda et al. | |
| 7,254,773 B2 | 8/2007 | Bates et al. | |
| 7,392,244 B1* | 6/2008 | Dean et al. | 707/3 |
| 2001/0000356 A1 | 4/2001 | Woods | |
| 2001/0032220 A1 | 10/2001 | Ven Hoff | |
| 2002/0010726 A1 | 1/2002 | Rogson | |
| 2002/0078106 A1 | 6/2002 | Carew et al. | |
| 2002/0087530 A1 | 7/2002 | Smith et al. | |
| 2002/0188586 A1 | 12/2002 | Veale | |
| 2002/0194076 A1 | 12/2002 | Williams, Jr. et al. | |
| 2002/0194229 A1 | 12/2002 | Decime et al. | |
| 2003/0023624 A1 | 1/2003 | Hamilton, II et al. | |
| 2003/0074375 A1 | 4/2003 | Nakamura et al. | |
| 2003/0200198 A1 | 10/2003 | Chandrasekar et al. | |
| 2003/0225773 A1 | 12/2003 | Jenssen et al. | |
| 2004/0064447 A1* | 4/2004 | Simske et al. | 707/5 |
| 2004/0073531 A1 | 4/2004 | Patterson | |
| 2004/0093567 A1 | 5/2004 | Schabes et al. | |
| 2004/0098154 A1 | 5/2004 | McCarthy | |
| 2004/0122661 A1 | 6/2004 | Hawkinson et al. | |
| 2004/0187084 A1 | 9/2004 | Berstis | |
| 2004/0205629 A1 | 10/2004 | Rosenholtz et al. | |
| 2004/0205672 A1 | 10/2004 | Bates et al. | |
| 2005/0005240 A1 | 1/2005 | Reynar et al. | |
| 2005/0027702 A1 | 2/2005 | Jensen et al. | |
| 2005/0028080 A1 | 2/2005 | Challenger et al. | |
| 2005/0044495 A1 | 2/2005 | Lee et al. | |
| 2005/0131886 A1 | 6/2005 | Ejerjed et al. | |
| 2005/0283726 A1 | 12/2005 | Lunati | |
| 2006/0047692 A1 | 3/2006 | Rosenblum et al. | |
| 2006/0129387 A1 | 6/2006 | Mitchell et al. | |
| 2006/0143564 A1 | 6/2006 | Bates et al. | |
| 2006/0215936 A1 | 9/2006 | Dorfman et al. | |
| 2007/0162281 A1* | 7/2007 | Saitoh et al. | 704/251 |

OTHER PUBLICATIONS

Willis et al., A Proposal for Minimally Extending VHDL to Achieve Data Encapsulation, Late Binding and Multiple Inheritance, Google 1994, pp. 5.31-5.38.*
Jones, Linguistic searching versus relevance ranking: Dr-Link and Target, Google Scholar 1999, pp. 67-80. cited by examiner.
U.S. Patent and Trademark Office, Office Action issued in related U.S. Appl. No. 09/751,574, dated Mar. 4, 2004.
U.S. Patent and Trademark Office, Office Action issued in related U.S. Appl. No. 09/751,574, dated Apr. 11, 2005.
U.S. Patent and Trademark Office, Final Office Action issued in related U.S. Appl. No. 09/751,574, dated Nov. 7, 2005.
U.S. Patent and Trademark Office, Office Action issued in related U.S. Appl. No. 09/751,574, dated Jun. 13, 2006.
U.S. Patent and Trademark Office, Office Action issued in related U.S. Appl. No. 09/751,574, dated Nov. 29, 2006.
U.S. Patent and Trademark Office, Notice of Allowance issued in related U.S. Appl. No. 09/751,574, dated Apr. 6, 2007.
U.S. Patent and Trademark Office, Office Action issued in related U.S. Appl. No. 11/359,686, dated Jul. 26, 2006.
U.S. Patent and Trademark Office, Office Action issued in related U.S. Appl. No. 11/359,686, dated Jan. 8, 2007.
U.S. Patent and Trademark Office, Final Office Action issued in related U.S. Appl. No. 11/359,686, dated Nov. 26, 2007.
U.S. Patent and Trademark Office, Office Action issued in related U.S. Appl. No. 11/359,686, dated Mar. 25, 2008.
U.S. Patent and Trademark Office, Office Action issued in related U.S. Appl. No. 11/359,686, dated Sep. 30, 2008.
U.S. Patent and Trademark Office, Notice of Allowance issued in related U.S. Appl. No. 11/359,686, dated Mar. 19, 2009.
Ballesteros et al. Resolving Ambiguity for Cross-language Retrieval, ACM 1998, pp. 64-71.

* cited by examiner

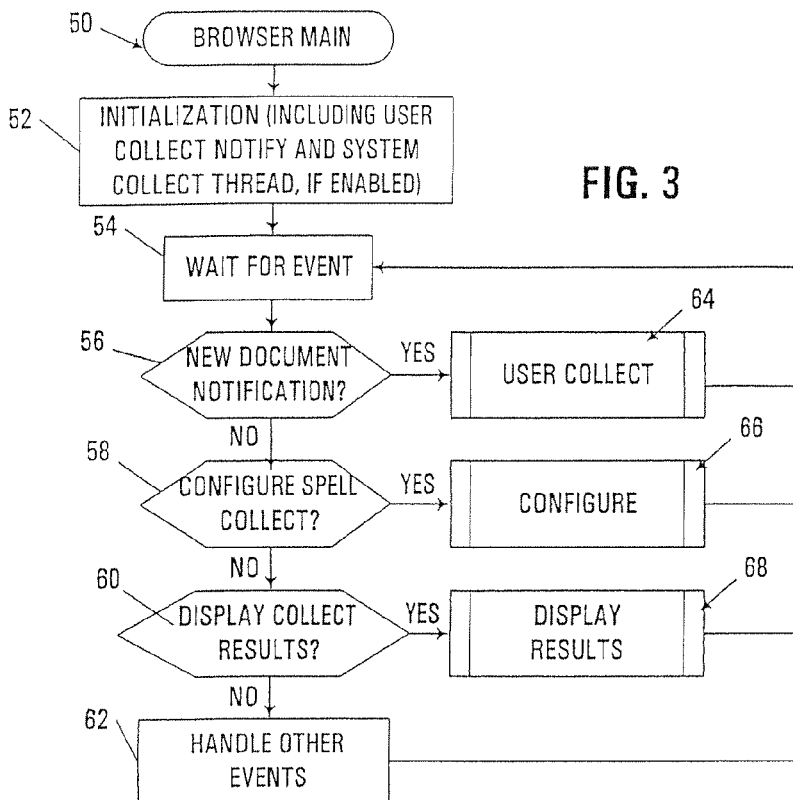
FIG. 3
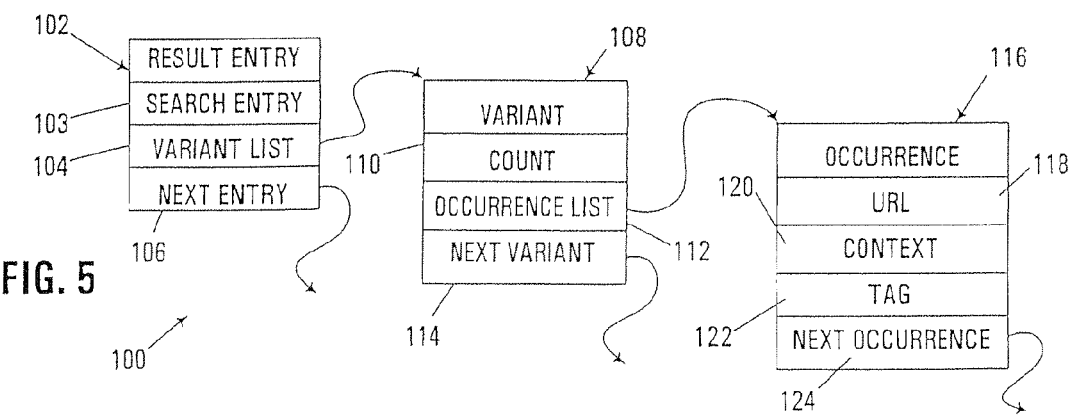
FIG. 4
FIG. 5

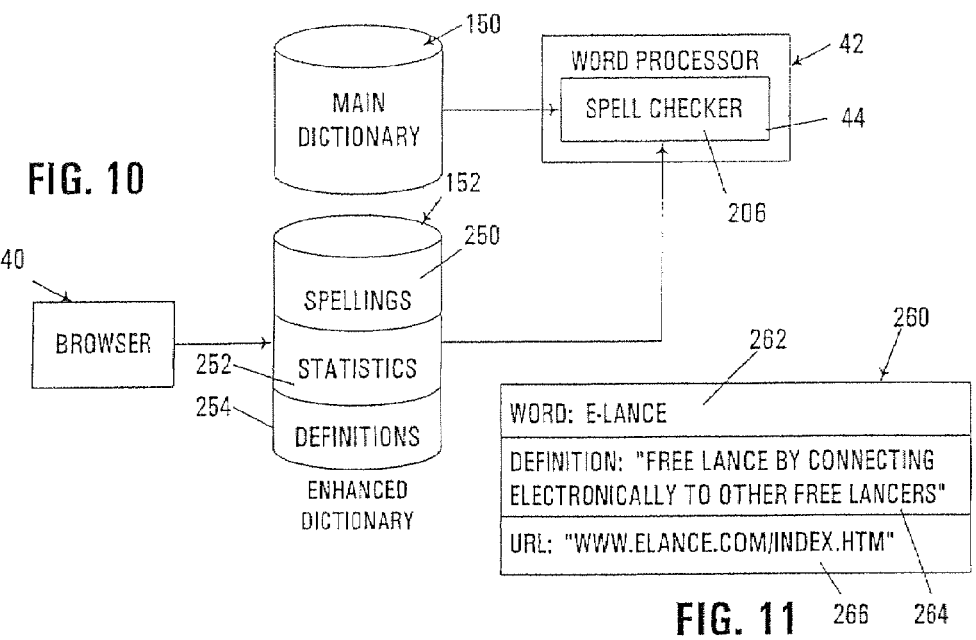
FIG. 10
FIG. 11
< SPELLDEF WORD = "e-lance"
    DEF = "free lance by connecting electronically to other free lancers" >
270    FIG. 12
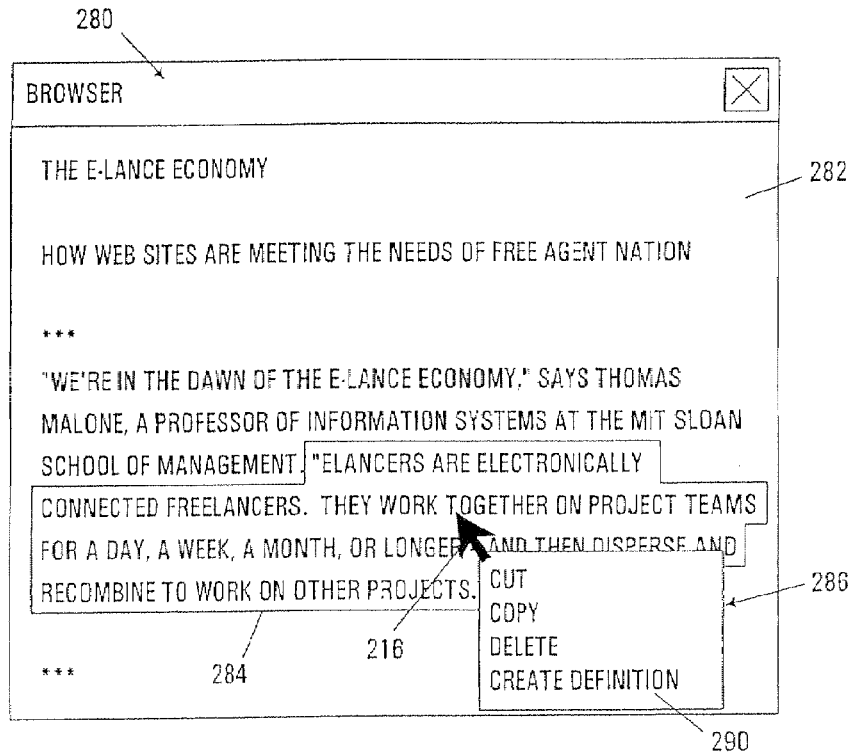
FIG. 13

AUTOMATED SPELL ANALYSIS

CROSS-REFERENCE TO RELATED APPLICATIONS

This application is a continuation of U.S. patent application Ser. No. 11/359,686, filed on Feb. 22, 2006 by Cary Lee Bates et al., which is a continuation of U.S. patent application Ser. No. 09/751,574, filed on Dec. 29, 2000 by Cary Lee Bates et al., both entitled AUTOMATED SPELL ANALYSIS, the entire disclosures of which are incorporated by reference herein.

FIELD OF THE INVENTION

The invention is generally related to computers and computer software. More specifically, the invention is generally related to spell checking and analysis.

BACKGROUND OF THE INVENTION

Computer technology has and continues to have a dramatic impact on all aspects of the human experience. For example, much of the new technology in the computer field defies definition using conventional terminology, and as a result, new words, terms, and phrases are added to the public's lexicon every day. Whereas the term "e-mail" meant something to only a few people only 10 years ago, today the term is practically as ubiquitous as the term "fire."

Furthermore, the advent of public networks such as the Internet have made it substantially easier for people to communicate with other people all over the world, as well as to access a wide variety of information from other computers located all over the world. One particularly interesting side effect of the Internet's bringing together of people from across the globe is the sweeping cultural changes that are beginning to occur. People with vastly different backgrounds, cultures, native languages, and the like are able to communicate electronically with one another with relative ease despite the fact that those people are located in different states, different countries or even different continents. As a result, people are exposed to new cultures, languages, and experiences that otherwise they might not experience outside of the electronic realm.

The world is consequently in the midst of a renaissance of culture and language, with the public's lexicon constantly in a state of flux. As new linguistic terms spring up and old terms cease to be used, it becomes difficult, particularly for writers and authors, and even for those corresponding informally with others by electronic messaging, to ensure the proper usage of terms in their compositions. Adding the fact that the informal nature of many electronic communications often diminishes one's desire to carefully and properly use terminology, the ability to ensure the proper spellings and usages of linguistic terms becomes even more difficult.

Automated spell checkers have been around for a number of years, and are used by a number of computer applications, including word processors, electronic messaging applications, desktop publishing applications, etc. Automated spell checkers generally operate by comparing words in a document against an electronic dictionary of terms, and identifying words that are not found in the dictionary as potential misspellings. Users often are permitted to customize their dictionaries by manually adding new terms.

However, the utility of an automated spell checker is often limited somewhat where technical terms, or other terms of art, are present in a document. Legal or scientific documents may contain a significant number of terms that are not found in common dictionaries. Some field-specific dictionaries have been made available to users that frequently author in a certain field. Otherwise, users that frequently use uncommon terms are generally required to manually add those terms to dictionaries over time to incorporate those terms into their spell checker's "vocabulary."

Considering the rapid influx of new terms brought about by the Internet and technology in general, however, maintaining spell checkers current is an arduous task. Electronic dictionaries are generally not updated particularly frequently, and users may not be particularly aggressive in adding new terms to a custom dictionary.

Perhaps more importantly, users may not be sure of what the proper spelling or punctuation for a linguistic term should be. For some terms, in fact, there may not even be a single spelling or punctuation of a term that is generally regarded as the "correct" usage of that term. For example, is "e-mail" spelled with or without a dash? Should the term "data warehousing" have a hyphen?

Similar problems may also exist for company names (is the "com" in a dot-com company's name capitalized?), as well as slang expressions (is "cheese head" one word or two?). Moreover, acronyms may stand for different things (e.g., "DVD" has been considered by different people to stand for either "digital video disk" or "digital versatile disk").

From the standpoint of an author or writer (or even the casual e-mail user), it would be extremely beneficial to be able to determine the proper (or most appropriate) spelling, punctuation, meaning and/or usage of linguistic terms, particularly newly-coined terms. Whether or not that person used such knowledge to update a dictionary, or simply to improve the quality of his or her writings, the benefits of obtaining such knowledge would be significant.

SUMMARY OF THE INVENTION

The invention addresses these and other problems associated with the prior art by providing an apparatus, program product and method that utilize automated analysis techniques to assist in the determination of acceptable usages of linguistic terms (e.g., words, phrases, acronyms, etc.). In particular, automated analysis consistent with the invention determines an acceptable usage of a linguistic term by scanning a plurality of documents for variants (e.g., based on differing spellings, punctuation, capitalization, meaning or definition, etc.) of the term, and tracking relative occurrences of a plurality of such variants found in the plurality of documents during scanning. By tracking occurrences of linguistic term variants, users may be able to use such statistical information to select which of the available variants represents an acceptable usage, or even a most acceptable usage, of a term.

In various embodiments consistent with the invention, the automated analysis described herein may be based on documents retrieved from the Internet, and often performed while a user is browsing the Internet (typically either based on analysis of documents as they are retrieved from the Internet, or previously-retrieved documents stored in a local history cache for a user). As a result, selection of an acceptable usage of a linguistic term may often be based on which of various alternatives is most often chosen by other users, which is often a logical choice given the dynamic nature of culture and language that has resulted from the introduction of the Internet. Moreover, the determined acceptable usage may be stored in an electronic dictionary accessible by a spell checker.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the program flow of a main routine executed by the browser of FIG. 2.

FIG. 4 is an exemplary implementation of a search table data structure utilized by the browser of FIG. 2.

FIG. 5 is an exemplary implementation of a result table data structure utilized by the browser of FIG. 2.

FIG. 10 is a block diagram illustrating the interaction of the browser and word processor of FIG. 2 with a spell check dictionary.

FIG. 11 is a block diagram of an exemplary implementation of a dictionary entry in the spell check dictionary of FIG. 10.

FIG. 12 is a block diagram of an exemplary implementation of an HTML-type spell definition tag capable of being recognized by the browser of FIG. 2.

FIG. 13 is a block diagram of an exemplary browser window displayed by the browser of FIG. 2, illustrating a definition creation operation performed thereby.

DETAILED DESCRIPTION

Figure 1:
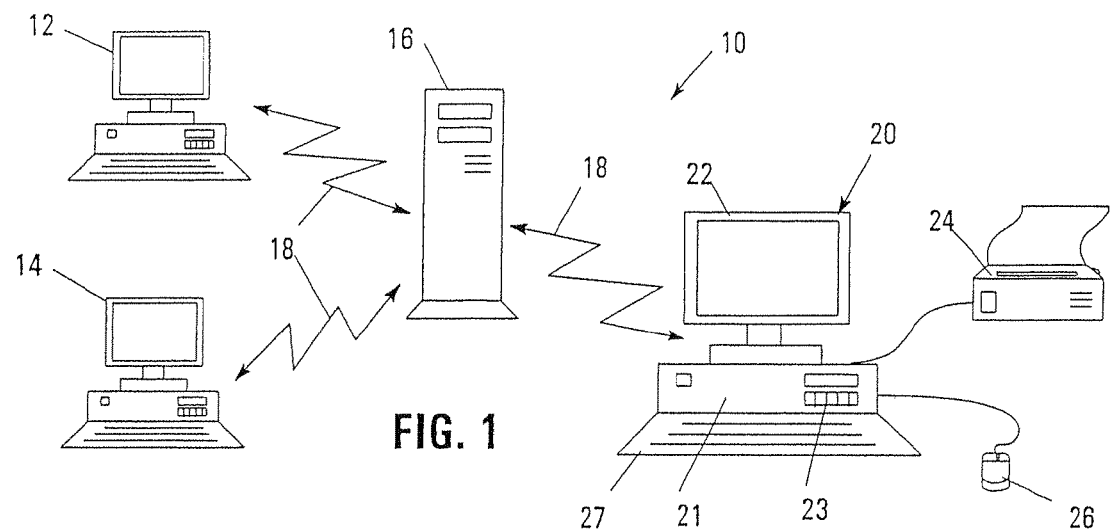
FIG. 1 is a block diagram of a computer system consistent with the invention.

The embodiments described hereinafter perform automated spell analysis on one or more documents to track the relative occurrences of multiple variants of one or more linguistic terms to determine acceptable usages of those terms. A linguistic term, in this context, may refer to a word or phrase of words, as well as an acronym representing a compound term. In general, the meaning of a linguistic term may or may not be previously known by a user desiring information on that term.

As discussed above, it may be desirable to determine an acceptable usage of a linguistic term based upon several different variants of that term. Variants of a term may differ in a number of manners, including spelling, punctuation, capitalization, definition or meaning, etc. Moreover, the determination of an acceptable usage of a linguistic term may or may not represent the only permissible usage of that term. For example, in many instances, a newly-coined word may not have a single "accepted" usage—rather, multiple acceptable usages may develop among different groups of users. An acceptable usage may correspond to the most common usage of a term, although in some instances, an acceptable usage may be determined based upon the frequency of occurrence of that usage exceeding a certain threshold, or based on the type of audience, e.g., slang or formal.

It is envisioned the automated spell analysis consistent with the invention may enable a number of unique features to be implemented within a computer or other data processing system. For example, in one embodiment, terms of interest may be analyzed as one browses the Internet or web. Therefore, supposing one submits the word "e-mail" for analysis, as that person browses the web and visit web sites, counts of different variants, such as "email", "e-mail" and E-mail" may be made. The statistics may be gathered so that one can see the spellings that are being used by others.

Also, given that a user may or may not know how to spell a term, it may be desirable for a user to be permitted to enter alternate spellings, punctuations, etc., of a term, so that an initial best guess may include more than one variant. When one does not enter a variant, or misspells it, it may be desirable to provide non-linear logic such as phonetic comparison or other "fuzzy logic" to assist in finding variant spellings. Hyphens may be squeezed or added for additional variants.

It may also be desirable to perform acronym analysis in a similar manner. For example, the acronym "CRM" may be used in a given article, where in an early paragraph the text includes "A range of customer relationship management (CRM) solutions have surfaced recently in the data warehouse-intensive AS/400 market . . . " In such a case, the acronym would need to be captured only once in the article by looking for its first occurrence in parenthesis and where the words of the first letters in the acronym are given.

It may be desirable to incorporate functionality for being selective of the sites analyzed to increase quality. For example, analysis of computer terms could draw from computer news sites and ignore newsgroups, given that many people often do not use spell checks when interacting in newsgroups. On the other hand, if one was looking for new slang terms, one might give a priority to newsgroups. Similarly, it may be desirable to prioritize variants found in data definition tables within documents, and variants found under section headings entitled "glossary" or the like, since in these sections more attention is generally paid to the accuracy of terms.

It may also be desirable to weight an analysis based on the "value" of the documents or sites being analyzed. It may also be desirable to support an automated or background mode that can search preferred sites during idle time. The HTML code "®" for the registered trademark symbol (®), or the HTML code "©" for the copyright symbol (©), may also be used to weight the value of a spelling if the code occurs next to the word or phrase.

A novel HTML-type tag may also be supported to identify a trademark term, or other form of accepted usage, where the author of a document wishes to clarify a desired usage. With this tag, a trademark owner could specify the exact spelling, and a user's spell checker would not have to rely on statistical sampling. A tag could also encourage the correct spelling of a new term from the start. It may be desirable to permit an analysis tool to scan for these tags and give them priority over other forms of sampling.

It may also be desirable to perform a more general collection of all new words and names not currently in Webster's or another standard dictionary, and not currently in a user's custom dictionary, etc., by periodically browsing the Internet, then making this information available. For example, a new word analysis might return a new word such as "neatnik" (one obsessed with being neat and not sloppy), even though the user had never specifically requested analysis or even heard of the word before. These could also be collected just on the pages a user (or multiple users) visits (e.g., stored in a user's local history cache), so as not to introduce foreign languages into the list. Otherwise, a web crawling approach could be used to broaden analysis. Statistical methods could be used to eliminate misspellings.

It may also be desirable to collect not just occurrences of a term by itself, but also the sentence or paragraph in which it is embedded in order to see commonly surrounding words, the syntax of a term's usage, and by inference the term's meaning. For example, consider a term such as "e-lance", which one might like to learn more about. One could enter this into his or her search analysis with provision for sentence and/or paragraph syntax (also referred to herein as "context"), and have returned a collection of usages of this term. Variant spellings could also be returned.

Automated spell analysis tools consistent with the invention may also interface with other programs such as word processors or other applications that incorporate spell checking (including stand-alone spell checkers). For example, acceptable usages of terms may be stored in an electronic dictionary for use by such other applications. It may also be desirable to incorporate into a spell checker the ability, if a term is not found during spell checking, to search the Internet for usage of the term in the manner discussed herein, then show the found variants. Further, results of automated spell analysis may be distributed to other users (e.g., via electronic messaging, file transfer or the like), or shared by multiple users from a central repository (e.g., a central database and/or analysis tool).

A significant advantage of the embodiments discussed herein over conventional, manual processes such as manually searching dictionaries, or manually searching the Internet for words or word fragments, is the relatively automated and seamless manner in which term evaluation information may often be obtained. Embodiments consistent with the invention often can automate much of the information gathering and analysis, including background searching, statistical analysis, and value weighting of results. Further, because such embodiments can often operate in background mode, the statistics and searches users desire can be available to those users when they want them. Users typically do not have to wait several minutes for a search analysis—much of the analysis can be performed concurrently with browsing the web. Further, in many instances the analysis results are available for use by other applications, e.g., word processors and the like.

Prior to discussing specific embodiments of the invention, a brief description of exemplary hardware and software environments for use therewith is provided.

Hardware and Software Environment

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
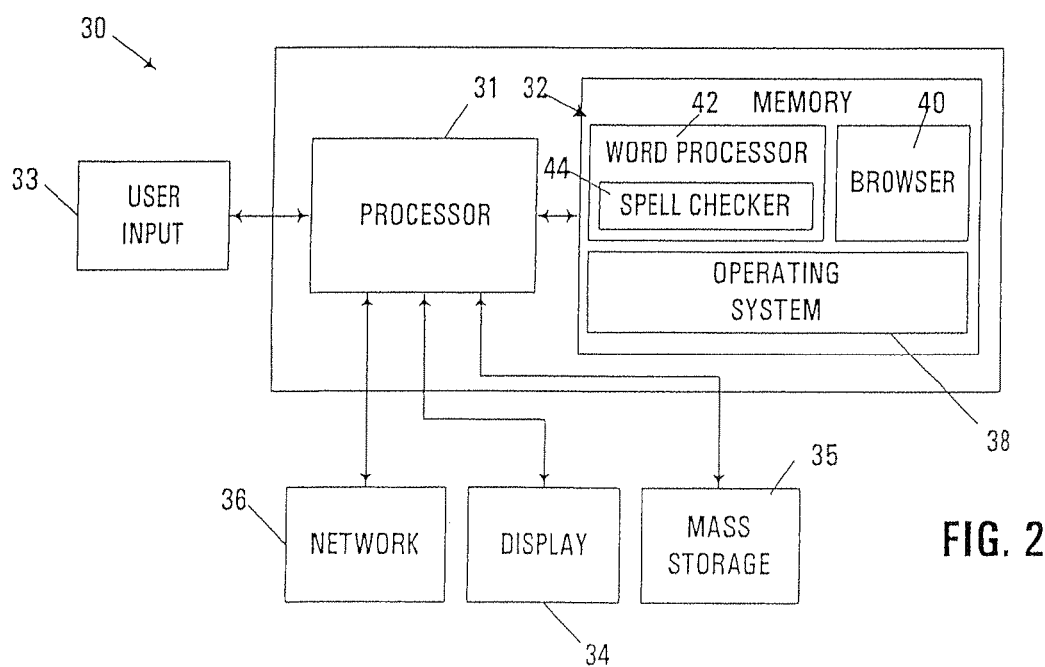
FIG. 2 is a block diagram of an exemplary hardware and software environment for a computer from the computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, a handheld computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others).

For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 38, and executes or otherwise relies upon various computer software applications, components, programs, objects, modules, data structures, etc. (e.g., browser 40, word processor 42 and spell check engine 44, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Automated Spell Analysis

An exemplary implementation of the invention in an Internet-based computing environment is discussed in greater detail hereinafter, specifically in the context of the automated analysis of spellings for documents retrieved from a public information source such as the Internet. It will be appreciated, however, that the principles of the invention may be applied to operate with other public information sources, as well as various private information sources, e.g., an intranet, an extranet, or even another form of public or private network, or local computer storage system. In the exemplary implementation, automated spell analysis functionality is implemented within an Hypertext Markup Language (HTML)-compatible web browser computer program. However, it will be appreciated that such analysis may be performed by other computer programs capable of accessing potential sources of search terms to be analyzed. Therefore, the invention is not limited to the particular implementation discussed herein.

FIG. 3, in particular, illustrates a main routine 50 executed by browser computer program 40 of FIG. 2, which supports automated spell analysis consistent with the invention.

Upon startup of the browser, main routine 50 performs routine initialization in block 52, much of which is well known in the art. In addition, during initialization routine 50 may start a number of threads, e.g., a user collect notify thread and a system collect thread, if either is enabled.

In particular, in the illustrated embodiment of FIG. 3, two primary automated tools are used to perform automated spell analysis. A first analysis tool is a user-configurable tool (referred to hereinafter as a "user collect" tool) that performs analysis on specific terms selected by a user, and based on specific configuration settings provided by the user. A second analysis tool is referred to as a "system collect" tool, which generally operates in the background and performs a typically more generalized form of automated analysis. In the illustrated embodiment of FIG. 3, for example, the system collect tool analyzes documents that have been previously retrieved by a user (and hence maintained in a history cache) for non-enumerated search terms to attempt to build a library of potentially new terms to be added to a user's custom dictionary.

To provide the ability for the user collect tool to analyze only new documents retrieved by a user, the user collect notify thread is used to verify whether a document retrieved by a user is in fact "new" with respect to the user collect tool, and if so, to send a "new document notification" event to the browser to initiate the user collect process on that document. The new/old status of a document may be determined, for example, based on whether the URL for the document is stored in a cache of previously-analyzed documents, or based upon other manners of detecting prior retrieval of a document as are known in the art. The user collect notify thread therefore is typically configured to detect (e.g., via an event) the retrieval of a new document by a user, determine whether the document is new and needs to be analyzed, and if so to send the new document notification event to the main routine of the browser.

Also, to provide the ability for the system collect tool to analyze documents independent of a user's browsing, the system collect tool typically runs in the background, and in a separate thread.

It should be appreciated, however, that the multithreaded-based implementation discussed herein may not be used in other embodiments. Moreover, it should be appreciated that either the user or system collect tool may be used independent of the other in some embodiments.

After initialization, an event-driven loop is initiated in block 54. In the event-driven loop, events directed to the web browser, e.g., user input, receipt of download data, etc., are passed to the browser via an event protocol as is well known in the art. Other programming models may be utilized in the alternative. Receipt of an event passes control from block 54 to blocks 56-62 to decode and handle the event as appropriate. Block 56, for example, detects a new document notification event, which may be generated, for example, by the user collect notify thread in response to retrieval of a new document by a user. In response to such an event, routine 50 calls a user collect routine 64 to perform automated spell analysis on the new document. Control then returns to block 54 to wait for more events.

Block 58 detects a configure spell collect event, which may be generated, for example, in response to selection of an appropriate menu item, button, or other user interface control on the browser that a user may invoke to configure the user collect tool. In response to such an event, routine 50 calls a configure routine 66 to configure the user collect tool. Control then returns to block 54 to wait for more events.

Block 60 detects a display collect results event, which may be generated, for example, in response to selection of an appropriate menu item, button, or other user interface control on the browser that a user may invoke to display the current result information generated by the user and/or system collect tools. In response to such an event, routine 50 calls a display results routine 68 to display the current results. Control then returns to block 54 to wait for more events.

A number of additional events, which are not relevant to an understanding of the invention, are detected and handled in a conventional manner in block 62, followed by a return to block 54 to process additional events.

In the illustrated embodiment, a search table and a user result table are utilized to store, respectively, search parameter information used to constrain a user collection operation on a document to be scanned, and result information representing the tracked occurrences of variants of a particular linguistic term. FIG. 4, for example, illustrates an exemplary search table 80 including a plurality of entries 82, each including a search term field 84, a collect context field 86, a context size field 88, a fuzzy search field 90 and a source parameters field 92.

Search term field 84 stores a number of enumerated variants of a linguistic term to be analyzed. As such, typically punctuation, capitalization and hyphenation are included if appropriate. Collect context field 86 stores a flag for each entry that controls whether surrounding text is stored for each occurrence of a particular variant. By collecting context surrounding text, a user is permitted to determine whether a particular occurrence of a variant is relevant, or even if a particular occurrence is more relevant than another.

In association with context field 86, a context size field 88 is used to determine the size of the surrounding text to store with each occurrence of a search term. The context size may be specified in any number of units, e.g., paragraphs, words, sentences, characters, bytes, etc. For example, the units of the context size shown in FIG. 4 might be paragraphs (designated with a "p").

Search field 90 stores a fuzzy search flag that indicates whether or not fuzzy logic should be used in identifying potential variants of a linguistic term. Support for fuzzy logic and other non-linear logic to determine other possible variants is optionally supported in the illustrated implementation. It should be appreciated that any programming methodology may be utilized to detect unenumerated variants of a linguistic term consistent with the invention.

Source parameters field 92 stores a number of source parameters for a linguistic term, which serve to limit the types of documents to be analyzed in compiling results for a particular linguistic term and its variants. Any number of parameters and parameter formats may be used, e.g., Boolean logic, an enumerated list of accepted or excluded sites, information regarding permitted or prohibited types of documents (e.g., web sites versus news groups), etc. Moreover, source parameters may be associated with weights to permit variants of a term associated with particular types of documents to be weighted more heavily in the results than those associated with other types of documents.

In addition, source parameters may limit the regions within a document that are included or excluded in analysis. Moreover, various weights may be applied to variants found in different regions of a document. For example, variants found under a section heading entitled "glossary" or the like may be weighted higher than variants found in other areas of a document.

It should be appreciated that a wide variety of data structures may be utilized to store source parameters, e.g., a table, linked list, or pointer to acceptable sites for the term.

FIG. 5 illustrates a user result table 100 in greater detail. User result table 100 is illustrated as a linked list including a plurality of result entry records 102 defining the entries in the result table. Other data structures may be utilized to store result information in the alternative.

Each result entry 102 is associated with a particular linguistic term, and may be associated with a particular entry in search table 80, as represented by field 103. Each result entry also includes a variant list field 104 and a next entry field 106. Variant list field 104 points to a linked list of variant records 108, representative of each variant for a particular linguistic term. Next entry field 106 points to the next entry in the result table, with a last such entry storing a null pointer.

Each variant record 108 includes a count field 110 that stores the number of occurrences found for that variant. In addition, a pair of pointer fields 112, 114 are included in each record 108. An occurrence list field 112 includes a pointer to a linked list of occurrence records 116, while next variant field 114 stores a pointer to the next variant for a particular linguistic term.

Each occurrence record 116 stores occurrence information about a particular variant. Within each record is a URL field 118 that stores an identifier for a document within which an occurrence is found. Field 120 stores context information, representing the surrounding text captured for a particular occurrence.

Field 122 stores tag information for an occurrence, if it is found that the occurrence is associated with a particular HTML-type tag that has been inserted in a document to provide a definition or a preferred variant of a particular linguistic term. Field 124 stores a next occurrence pointer that points to the next occurrence record 116 for a particular variant.

It will be appreciated that a wide variety of alternate data structures may be used, and that a wide variety of alternate types of information may be managed and tracked in either of tables 80, 100. Thus, the invention is not limited to the implementations disclosed herein.

Figure 6:
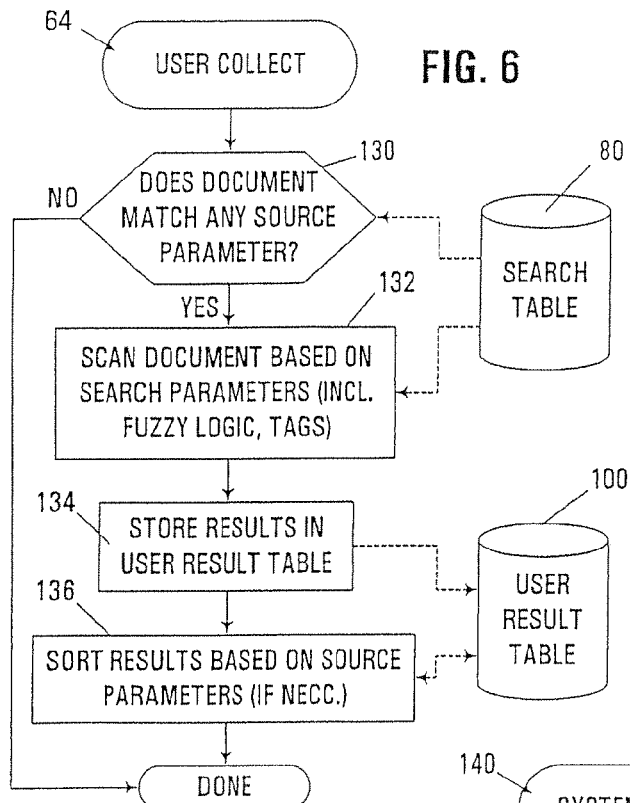
FIG. 6 is a flowchart illustrating the program flow of the user collect routine referenced in FIG. 3.

FIG. 6 illustrates user collect routine 64 referenced in FIG. 3. As shown in FIG. 6, routine 64 interacts with search table 80 and user result table 100 when processing a new document.

Routine 64 begins in block 130 by first determining whether the document matches any source parameters associated with any search entry in search table 80—that is, whether any entry in the table authorizes inclusion of the document in analysis results for its associated linguistic term based upon the source parameters associated with that entry.

If not, no analysis of the document need be performed, and routine 64 terminates. Otherwise, control passes to block 132 to scan the document based upon the search parameters for any entry for which scanning of the document is authorized. During this scan, typically the entire document is compared against the enumerated variants for each linguistic term for which scanning with this document is authorized. In addition, if the fuzzy logic flag is set, fuzzy logic techniques are utilized to expand the number of variants searched, e.g., to automatically add or remove hyphens, change capitalizations, modify spellings to "sounds-alike" variants, etc.

Next, block 134 stores the results in the user result table, typically creating additional variant and/or occurrence records within the table as they are needed. Next, block 136 optionally sorts the results based upon any source parameters, if such functionality is supported. For example, occurrences of a particular variant may be sorted based upon the locations within a document that particular occurrences are found. In addition, variants may be sorted for a particular search term based upon their relative frequencies of occurrence. In the alternative, weighting information may be maintained in the database, with a dynamic sort performed during display of the search results, whereby sorting of the result table in routine 64 would not be necessary. Upon completion of block 136, routine 64 is complete.

Figure 7:
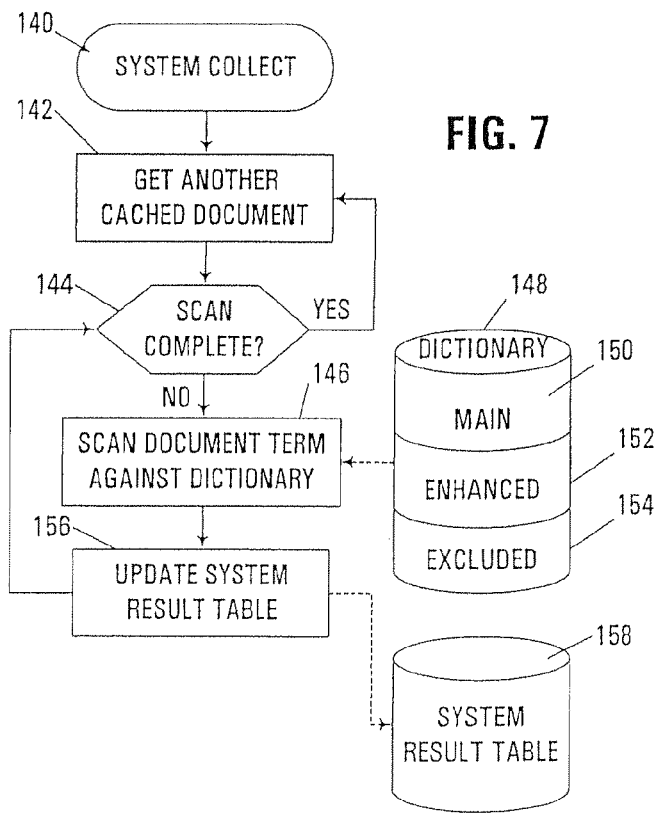
FIG. 7 is a flowchart illustrating the program flow of the system collect routine referenced in FIG. 3.

FIG. 7 illustrates a system collect routine 140, e.g., used to implement the system collect thread discussed above. Routine 140 begins in block 142 by retrieving another cached document from the local history cache on a user's computer. As is well known in the art, documents retrieved from the Internet or another network are typically retained for some time in a local history cache to accelerate repeated viewings of a particular document.

In the illustrated implementation, the documents in this cache are periodically scanned to attempt to identify new terms for potential addition to an electronic dictionary, or otherwise to report to a user the potential creation of an acceptable term. In other embodiments a "web crawler" approach may be used, whereby documents to be scanned are retrieved from the Internet or another network based upon a crawler methodology, rather than being based on documents previously retrieved by a user. In other embodiments, e.g., in a server environment that is used to cache documents on behalf of a plurality of users, it may be desirable to run a system collect thread to perform analysis on a large set of documents for use in updating an electronic dictionary shared by multiple users.

For each retrieved cache document, control passes to block 144 to perform a loop that scans the document against an electronic dictionary. In particular, as long as a scan of a document is not complete, block 144 passes control to block 146 to scan another term in the document against an electronic dictionary 148. The scan of the document may be similar to the operation of a conventional spell checker, whereby each term found in the document is compared against a dictionary to determine whether the document matches any term within the dictionary.

As shown in FIG. 7, an electronic dictionary 148 may include a main dictionary 150, typically representing a standard set of dictionary terms that are widely accepted, e.g., based upon a published dictionary such as Webster's Dictionary. In addition, an electronic dictionary may also include an enhanced dictionary 152 which may store, for example, additional terms either added specifically by a user, or added by the operation of the spell analysis tools discussed herein. In addition, an electronic dictionary may include an excluded dictionary 154 that identifies one or more terms that should be excluded as acceptable terms.

Next, as shown in block 156, based upon the scan of the document term against the dictionary, a system result table 158 is updated in much the same manner as user result table 100. Typically, system result table 158 may take the same form of data structure as shown in FIG. 5. Alternate data structures may be used in the alternative. Moreover, it should be appreciated that, if a particular term in the document matches a term in the dictionary, an associated variant record in the system result table is updated to indicate the match. Moreover, if a term is found that is not in the dictionary, a new result entry may be added, or alternatively, if it is determined that the new term is likely a variant of an existing term, a variant record for an existing result entry may be added.

Upon completion of block 156, control returns to block 144 to scan additional terms in the document against the dictionary. Once the scan is complete, control returns to block 142 to retrieve another cache document.

It will be appreciated that system collect routine 140, operating as a separate thread, will execute in the background, typically while a user is browsing other documents. Thus, for performance concerns, it may be desirable to limit the processor bandwidth allocated to the system collect thread so as to minimize the discernable impact on system performance from the user's standpoint. In addition, in other embodiments it may be desirable to run system collect thread 140 when a user is not actively browsing, or in the least when a user is viewing a document but not actively interacting with a document or retrieving any new document. Other modifications will be apparent to one of ordinary skill in the art.

Figure 8:
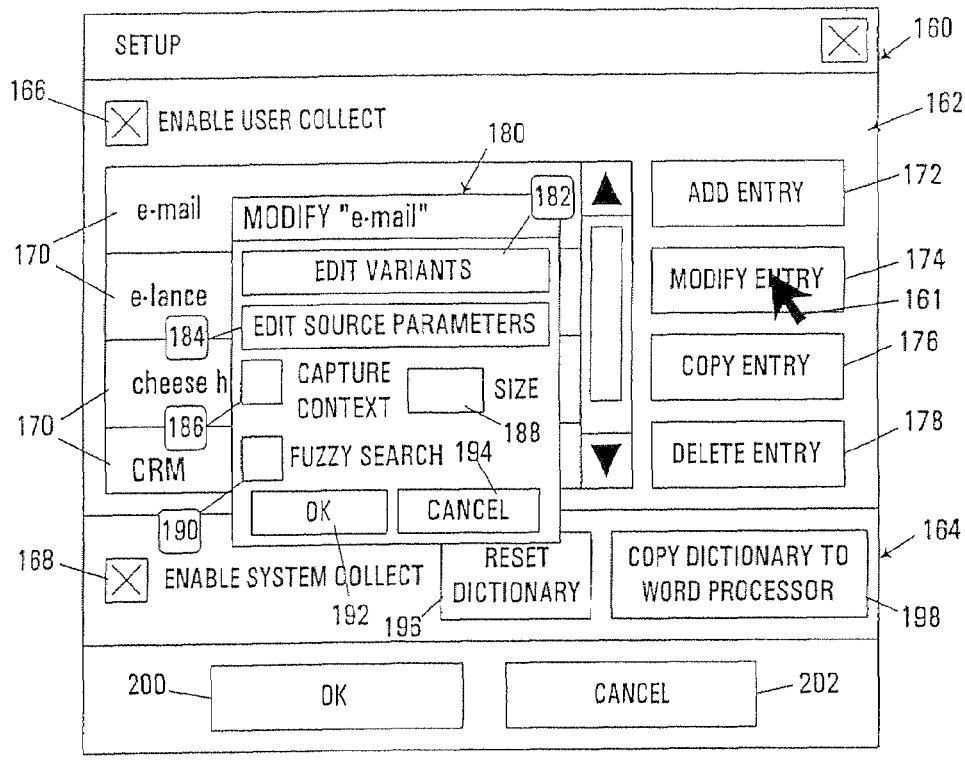
FIG. 8 is a block diagram of an exemplary setup window displayed by the configure routine referenced in FIG. 3.

Returning briefly to FIG. 3, a configure routine 66 is utilized to configure both the user and system collect tools so as to customize the tools for use according to a user's preferences. FIG. 8, for example, illustrates an exemplary setup window 160 that may be implemented by configure routine 66. Programming a routine to provide the underlying functionality of window 160 (as well as window 210, discussed below), would be well within the ability of one of ordinary skill in the art having the benefit of the instant disclosure.

In the exemplary setup window 160, user and system collect frames 162, 164 may be provided to distinguish the configuration settings for the user and system collect tools. Each tool may be selectively enabled or disabled using check boxes 166, 168. In addition, for the user collect tool, entries in the search table are presented with associated configuration entries 170 that respectively identify the linguistic terms being analyzed by the user collect tool. Various table manipulation controls are provided via a plurality of buttons 172-178. Button 172 permits a user to add a new entry to the search table, button 174 permits a user to modify a selected entry, button 176 permits a user to copy an entry, and button 178 permits a user to delete an entry.

For an existing entry, it may be desirable to modify the entry, which is enabled in the illustrated embodiment through a modify dialog box 180 displayed, for example, in response to selection of button 174 with a pointer 161, or alternatively, through a pop-up menu selected when pointer 161 is directed at the entry to be modified. Dialog box 180 includes a number of user interface controls to modify an entry (e.g., the e-mail entry shown in FIG. 8) in the search table. Button 182, for example, permits the user to add or remove variants for a particular linguistic term. Likewise, button 184 permits a user to edit the source parameters associated with an entry. Check box 186 permits a user to enable or disable context capture, with edit box 188 used to input a size, or amount of text surrounding an occurrence of a variant to be captured, along with the unit of measure (e.g., w for word, p for paragraph). Check box 190 enables or disables fuzzy or other non-linear search logic. In addition, OK and cancel buttons 192, 194 are used to close dialog box 180 when a user is finished with a modification to an entry.

For the system collect tool, it may be desirable to provide the ability to reset the associated dictionary via a button 196, or to copy the dictionary to a word processor dictionary via button 198. The former operation may be desired, for example when the enhanced dictionary utilized by the system collect tool needs to be reset. The latter operation may be used, for example, when the enhanced dictionary utilized by the system collect tool is different from that utilized by a word processor, and it is desirable to copy the enhanced dictionary to the dictionary for a word processor for use in a word processing application.

Setup window 160 also includes OK and cancel buttons 200, 202 to dismiss the window when configuration of the user and system collect tools is complete.

Figure 9:
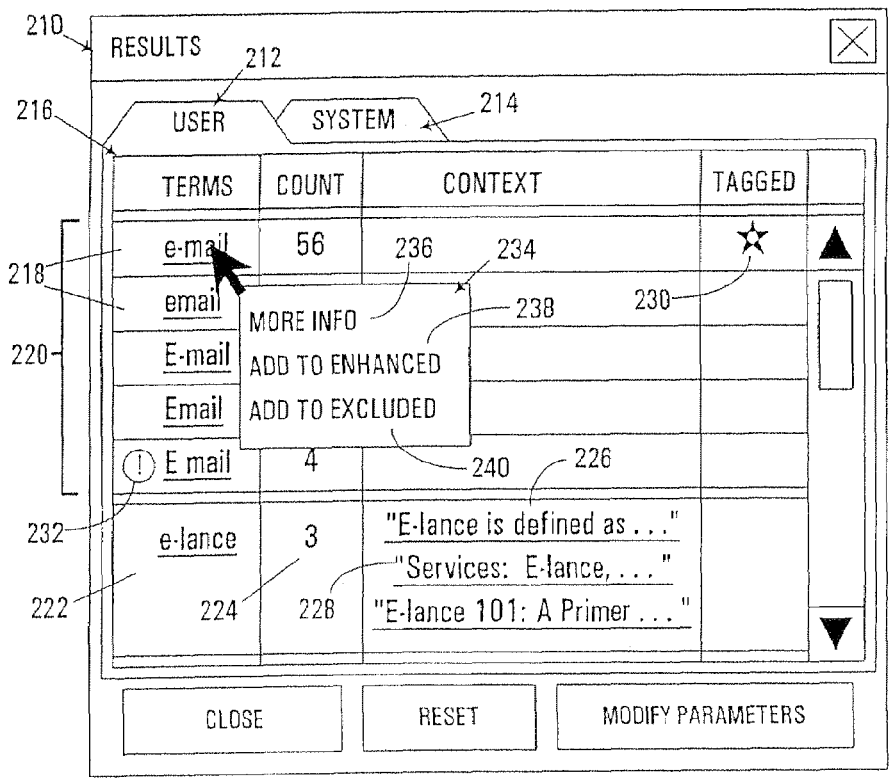
FIG. 9 is a block diagram of an exemplary result window displayed by the display results routine referenced in FIG. 3.

FIG. 9 next illustrates an exemplary implementation of a result window 210 used to display the current results of a spell analysis performed by the user and system collect tools. Window 210 is typically displayed and managed by display results routine 68 discussed above in connection with FIG. 3.

In the illustrated embodiment, the results of the user and system collect tools are displayed in separate frames, here selectable via tabs 212, 214. In the alternative, the results of the tools may be combined into a single display.

For the user-collected results, a table 216 is displayed including a plurality of variant entries 218 arranged in groups 220 for each entry in the result table. For each such entry, a term field 222 displays the associated variant, typically with a hypertext link format to permit a user to select the variant to obtain additional information on the entry. Each entry also includes a count field 224 displaying the relative number of occurrences for that variant. In other embodiments, a weighted score may be provided, and in general, typically the variants for a given linguistic term would be sorted by frequency of occurrence.

Each entry also includes a context field 226 illustrating brief contextual information for each occurrence of a particular variant. Each contextual snippet 228 may also be displayed in a hypertext link format to permit a user to select that context tool information to display the full contextual information.

In addition, each entry may also include a "tagged" field 230 that identifies whether an HTML-type tag providing a specified variant of the term was found. In the alternative, the weight of the associated occurrence may be adjusted based upon the presence of a tag.

As discussed above, variants of a term may either be enumerated or system generated, e.g., using phonetic comparison, fuzzy logic or other functionality. In instances where both types of variants may be found for a particular linguistic term, it may be desirable to distinguish those variants that are system generated, e.g., as illustrated by icon 232 displayed in window 210.

It may be desirable to support a number of user operations through interaction with the display of results to the user. For example, the user may be permitted to direct pointer 161 at a variant of a particular linguistic term and call up a pop-up menu 234 including a number of menu items 236, 238 and 240. Menu item 236 permits a user to obtain more information about the variant. Item 238 permits a user to add the variant to the enhanced dictionary, thereby making that variant an accepted usage of the term. In the alternative, the user may select item 240 to add the variant to the excluded dictionary and thereby identify the variant as a non-acceptable usage of the term.

Window 210 may also include a number of additional terms, e.g., a close button 242 used to close the window, a reset button 244 used to reset some or all of the collected information, and a modify parameters button 246 which may be used, for example, to bring up setup window 160 of FIG. 8.

It will be appreciated that a wide variety of alternate user interface controls and methodologies may be utilized to provide for setup, result display and other interaction with the user. Therefore, the invention is not limited to the particular implementations discussed herein. For example, it may be desirable to permit users to select an occurrence of a variant and call up the associated document using the URL stored for that document in the result table. In addition, a user may obtain additional information about particular variants or occurrences, e.g., where in the document those occurrences were found, how many times variants were found at the beginning of a sentence, which may affect the potential capitalization preference for a term, etc. A user may be capable of determining whether occurrences were found in a glossary of data definition section of a document, whether occurrences were associated with official trademark designations or copyright symbols, whether occurrences were found at preferred sites, etc.

Display of system results may be similar to those for the user collection tool. However, given the volume of terms that potentially may be tracked, it may be desirable to display only those results that exceed a preset threshold. Other modifications will be apparent to one of ordinary skill in the art having the benefit of the instant disclosure.

FIG. 10 next illustrates an exemplary interaction between browser 40 and word processor 42 in sharing dictionary terms among multiple applications. For example, spell checker 44 of word processor 42 may have access to both main dictionary 150 and enhanced dictionary 152. Based upon spell and automated spell analysis in the manner disclosed herein, browser 40 may be capable of storing information in enhanced dictionary 152. The enhanced dictionary may be capable of storing a number of types of information, including permitted spellings 250, statistics 252 associated with such spellings, and definitions 254 associated with such spellings.

The various spellings stored in enhanced dictionary 152 may be used by the spell checker to determine whether terms in a document being spell checked in the word processor are acceptable in view of the spellings included in the enhanced dictionary. Given the dynamic nature of terminology, it may also be desirable to store statistics such as the number of occurrences, contextual information and other stored result information in the enhanced dictionary as shown at 252 to permit the spell checker 44 to display such statistics to a user upon request. Moreover, it may be desirable to include definitions as shown at 254 so that a user may be presented with an accepted definition of a term upon request. Also, it may be desirable for spell checker 44 to invoke functionality in browser 40 (or to directly incorporate such functionality) to perform a web-based search in much the same manner as discussed herein, so that a user could quickly ascertain an acceptable usage for a term that has been rejected by the spell checker.

For example, a spell checker may be configured to perform a spell checking operation by comparing the terms in a document against an electronic dictionary, and to automatically perform a web-based search as described above (e.g., by scanning cached pages and/or crawling the Internet) whenever a term in the document is not found in the electronic dictionary. It may further be desirable to permit a user to be presented with the results of such a search (e.g., total occurrences, percentages of occurrences, etc. of different term variants) so the user can ascertain what variants, if any, are acceptable usages of the term.

Next, as shown in FIG. 11, an exemplary dictionary entry data structure 260 in enhanced dictionary 152 is illustrated, including a word field 262 displaying the accepted usage of a term, and further including a definition field 264 storing an accepted definition of the term, and a URL field 266 providing the location of a document providing an accepted definition of the term. Provision of the URL in field 266 would permit, for example, a user of the spell checker to call up the referenced document to obtain additional information on the word.

As discussed above, in some instances it may be desirable to incorporate an HTML-type tag to permit the author of a document to explicitly insert an accepted usage of a particular linguistic term. As shown in FIG. 12, for example, an exemplary HTML-type tag 270 is illustrated, including word and/or definition fields used to provide both an accepted usage, and an accepted definition of a term. It will be appreciated that other HTML-type formats, as well as other manners of indicating the presence of an accepted definition in a document, may also be used in the alternative.

It may also be desirable in some embodiments to permit browser 40 to dynamically add definitions to an enhanced dictionary in response to user input while browsing. For example, FIG. 13 displays a browser window 280 within which is displayed a hypertext document 282. When browsing a document, for example, a user may notice the definition of a term that he or she desires to store in the enhanced dictionary. To support this functionality, browser 40 may be configured to permit a user to select a section of text, as shown at 284, and call up a pop-up menu or other user interface control 286 and select a "create definition" item 290 to automatically add an entry to the enhanced dictionary including a desirable and accepted usage of a term and a definition provided in the selected text. In connection with storing the definition in the enhanced dictionary, a user may be required to enter the accepted usage of a term. Moreover, the URL of the document from which the text is extracted may also be associated with the definition to permit a user to later retrieve the document from which the definition was obtained.

In the alternative, or in addition, to dynamically adding definitions in response to user input, a browser may also be configured to automatically add definitions in response to the detection of the HTML-type tags as discussed above. Such automatic addition may optionally be performed without user intervention, or a user may be prompted prior to adding an entry to the electronic dictionary.

Various modifications may be made to the illustrated embodiments without departing from the spirit and scope of the invention. For example, as discussed above, acronyms may also be analyzed in a similar manner to other types of linguistic terms described above. Typically, analysis of an acronym would include the capture of contextual information so as to detect the words represented in the letters of an acronym. It may be desirable to include as each variant the various represented word combinations so that, when a document is scanned, those variants can be identified to determine a predominant acronym usage. In addition, when acronyms are being searched, the scanning of a document within which an acronym is found may be halted with respect to that acronym after the first occurrence is found, as it may be assumed that a particular acronym has the same usage throughout a particular document.

Other modifications will be apparent to one of ordinary skill in the art. Therefore, the invention lies in the claims hereinafter appended.

What is claimed is:

1. A computer-implemented method of analyzing linguistic terms, the method comprising:
   (a) scanning a plurality of documents for variants of a linguistic term; and
   (b) tracking relative occurrences of a plurality of variants of the linguistic term found in the plurality of documents during scanning to determine an acceptable usage of the linguistic term, wherein each variant of the linguistic term found in each document is of the type that is intentionally chosen by an author of such document and wherein the acceptable usage is determined by the variant having the greatest frequency of occurrences among the plurality of variants.

2. The method of claim 1, further comprising retrieving the plurality of documents from a network, wherein scanning the plurality of documents includes scanning each document subsequent to retrieval of the document from the network.

3. The method of claim 2, wherein retrieving the plurality of documents from the network comprises retrieving the plurality of documents from at least one Internet web site in response to a user browsing the at least one Internet web site, and wherein scanning the plurality of documents includes scanning each document upon retrieval of that document from the at least one Internet web site.

4. The method of claim 2, further comprising determining whether a retrieved document has already been scanned before scanning the retrieved document.

5. The method of claim 2, further comprising determining whether to scan a retrieved document based upon a source parameter associated with the linguistic term.

6. The method of claim 1, further comprising browsing a second plurality of documents retrieved from at least one Internet web site in response to user input, wherein scanning the first plurality of documents is performed concurrently with browsing the second plurality of documents.

7. The method of claim 6, wherein scanning the first plurality of documents is performed in a background thread while documents from the second plurality of documents are being browsed.

8. The method of claim 7, wherein scanning the first plurality of documents includes scanning documents stored in a local history cache.

9. The method of claim 1, wherein the linguistic term comprises a single word.

10. The method of claim 1, wherein the linguistic term comprises a phrase.

11. The method of claim 1, wherein the linguistic term comprises an acronym.

12. The method of claim 1, wherein the plurality of variants differ from one another based upon at least one of punctuation, spelling, capitalization, hyphenation, and definition.

13. The method of claim 1, wherein scanning the plurality of documents includes scanning a document for an enumerated variant of the linguistic term.

14. The method of claim 1, wherein scanning the plurality of documents includes scanning a document for an unenumerated variant of the linguistic term.

15. The method of claim 14, wherein scanning the document for the unenumerated variant of the linguistic term includes scanning the document using phonetic comparison.

16. The method of claim 1, wherein tracking relative occurrences of the plurality of variants includes weighting occurrences based upon locations of such occurrences within the plurality of documents.

17. The method of claim 1, wherein tracking relative occurrences of the plurality of variants includes weighting occurrences based upon document types of the documents within which such occurrences are found.

18. The method of claim 1, further comprising storing a variant of the linguistic term in an electronic dictionary.

19. The method of claim 18, further comprising spell checking a document using the electronic dictionary subsequent to storing the variant in the electronic dictionary.

20. The method of claim 1, wherein tracking relative occurrences of the plurality of variants includes storing context information associated with each occurrence of a variant of the linguistic term.

21. The method of claim 1, wherein scanning the plurality of documents includes scanning a document for a spell definition tag that identifies a variant of the linguistic term.

22. The method of claim 1, wherein scanning the plurality of documents and tracking relative occurrences are performed responsive to detecting a variant of the linguistic term during spell checking of a document.

23. The method of claim 1, wherein tracking relative occurrences of the plurality of variants of the linguistic term includes accumulating a count of the relative occurrences of a variant found in multiple documents among the plurality of documents.

24. A method of analyzing linguistic terms, the method comprising:

(a) browsing a plurality of web sites on the Internet in response to user input; and
(b) concurrently with browsing the plurality of web sites, tracking relative occurrences of a plurality of variants of a linguistic term found in the plurality of web sites to determine an acceptable usage of the linguistic term, wherein each variant of the linguistic term found in each web site is of the type that is intentionally chosen by an author of such web site and wherein the acceptable usage is determined by the variant having the greatest frequency of occurrences among the plurality of variants.

25. An apparatus, comprising:
(a) a memory; and
(b) a program resident in the memory and configured to determine an acceptable usage of a linguistic term by scanning a plurality of documents for variants of the linguistic term and tracking relative occurrences of a plurality of variants of the linguistic term found in the plurality of documents during scanning, wherein each variant of the linguistic term found in each document is of the type that is intentionally chosen by an author of such document and wherein the acceptable usage is determined by the variant having the greatest frequency of occurrences among the plurality of variants.

26. A program product, comprising:
(a) a program configured to determine an acceptable usage of a linguistic term by scanning a plurality of documents for variants of the linguistic term and tracking relative occurrences of a plurality of variants of the linguistic term found in the plurality of documents during scanning, wherein each variant of the linguistic term found in each document is of the type that is intentionally chosen by an author of such document and wherein the acceptable usage is determined by the variant having the greatest frequency of occurrences among the plurality of variants ; and
(b) a computer-readable storage medium storing the program.

* * * * *